US012272321B2

(12) United States Patent
Sun et al.

(10) Patent No.: US 12,272,321 B2
(45) Date of Patent: Apr. 8, 2025

(54) METHOD AND APPARATUS FOR LED DRIVER TO REDUCE CROSS TALK OR FLICKER

(71) Applicant: Apple Inc., Cupertino, CA (US)

(72) Inventors: Ming Sun, Santa Clara, CA (US); Nicola Rasera, Munich (DE); Robert D Zucker, Half Moon Bay, CA (US); Johan L Piper, Cupertino, CA (US); Denis M Darmon, Boulder, CO (US); Fabio Ongaro, Unterhaching (DE); Xiaofeng Wang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/243,011

(22) Filed: Sep. 6, 2023

(65) Prior Publication Data

US 2024/0096291 A1 Mar. 21, 2024

Related U.S. Application Data

(60) Provisional application No. 63/376,545, filed on Sep. 21, 2022.

(51) Int. Cl.
*G09G 3/34* (2006.01)

(52) U.S. Cl.
CPC ........... *G09G 3/3413* (2013.01); *G09G 3/346* (2013.01); *G09G 2320/0209* (2013.01); *G09G 2320/0247* (2013.01); *G09G 2330/021* (2013.01)

(58) Field of Classification Search
CPC ................. G09G 3/3413; G09G 3/346; G09G 2320/0209; G09G 2320/0247; G09G 2330/021; G09G 2320/0242; G09G 2310/0235; G09G 2330/028
See application file for complete search history.

(56) References Cited

U.S. PATENT DOCUMENTS

| | | | | |
|---|---|---|---|---|
| 7,019,725 B1 * | 3/2006 | Lee | G09G 3/3648 | 345/98 |
| 7,312,774 B1 * | 12/2007 | Yoshihara | G09G 3/3651 | 345/97 |
| 8,933,866 B2 * | 1/2015 | Lai | G09G 3/3233 | 315/169.3 |
| 9,280,924 B2 * | 3/2016 | Ake | G09G 3/3406 | |
| 9,646,521 B2 * | 5/2017 | Yamazaki | G09G 3/2003 | |
| 9,842,551 B2 * | 12/2017 | Yamashita | G09G 3/3611 | |
| 10,950,167 B1 * | 3/2021 | Chan | G09G 3/3266 | |
| 11,158,279 B2 * | 10/2021 | Lee | G09G 3/3688 | |
| 11,302,248 B2 * | 4/2022 | Halbritter | G09G 3/2081 | |
| 2003/0043103 A1 * | 3/2003 | Yoshihara | G09G 3/3406 | 345/87 |
| 2005/0041006 A1 * | 2/2005 | Lee | G09G 3/2011 | 345/99 |

(Continued)

*Primary Examiner* — Jose R Soto Lopez
(74) *Attorney, Agent, or Firm* — Fletcher Yoder, P.C.

(57) ABSTRACT

Systems and methods for electronic displays to use reference voltages to control driving current of illuminators are provided. The reference voltages are used to reduce or eliminate cross talk in driving voltages among different illuminators and driving voltage variations from frame to frame. The transient performance of the driving current of the illuminator (e.g., the current rise/decline time, current overshoot issue, current settling time) may be improved by implementing the reference voltages.

20 Claims, 8 Drawing Sheets

(56) References Cited

U.S. PATENT DOCUMENTS

2005/0140628 A1* 6/2005 Oh ........................ G09G 3/3406 345/89
2006/0132413 A1* 6/2006 Chen .................... G09G 3/3406 345/94
2006/0209012 A1* 9/2006 Hagood ............... G09G 3/3433 345/109
2006/0250325 A1* 11/2006 Hagood ............... G09G 3/3433 345/55
2006/0256039 A1* 11/2006 Hagood ............... G09G 3/3433 345/55
2006/0256069 A1* 11/2006 Okazaki ............... G09G 3/3655 345/102
2007/0008441 A1* 1/2007 Yoshihara ............ G09G 3/3659 349/39
2007/0164952 A1* 7/2007 Kim ..................... G09G 3/3655 345/87
2007/0171182 A1* 7/2007 Mizuno ................ G09G 3/3406 345/102
2007/0229447 A1* 10/2007 Takahara ............. G09G 3/3655 345/102
2007/0257879 A1* 11/2007 Lim ....................... H04N 25/76 345/102
2008/0192158 A1* 8/2008 Yoshihara ........... G02F 1/13471 349/33
2008/0284926 A1* 11/2008 Akiyama ............. G09G 3/3648 349/36
2009/0058794 A1* 3/2009 Iwamoto .............. G09G 3/3622 345/102
2009/0066621 A1* 3/2009 Iwamoto .............. G09G 3/3413 345/88
2010/0039365 A1* 2/2010 Wang ..................... G09G 3/342 345/102
2010/0053062 A1* 3/2010 Wang ................... G09G 3/3426 345/102
2010/0117551 A1* 5/2010 Lim ................... H05B 41/2827 315/254
2011/0089860 A1* 4/2011 Kuo ....................... G09G 3/003 315/294
2011/0101885 A1* 5/2011 Yang .................... G09G 3/3406 315/294
2011/0148948 A1* 6/2011 Gandhi ................ G02B 26/001 345/84
2011/0164076 A1* 7/2011 Lee ...................... G09G 3/3614 345/698
2011/0175935 A1* 7/2011 S ............................ H05B 45/20 345/213
2011/0267375 A1* 11/2011 Yang ...................... H05B 45/46 315/307
2011/0267387 A1* 11/2011 Baik .................... G09G 3/3406 345/76
2011/0279431 A1* 11/2011 Lee ...................... G09G 3/3655 345/211
2011/0310136 A1* 12/2011 Im ........................ G09G 3/3413 345/88
2012/0120342 A1* 5/2012 Uchimoto .......... H05B 45/3725 349/61
2012/0139420 A1* 6/2012 Lee .................... H05B 45/3725 315/122
2012/0274877 A1* 11/2012 Sasaki ................ H05B 45/3725 315/186
2012/0306388 A1* 12/2012 Jang ................... H05B 45/3725 315/186
2012/0313917 A1* 12/2012 Yamada ............. H05B 45/3725 315/297
2013/0038234 A1* 2/2013 Van Der Veen ....... H05B 45/48 315/224
2013/0088506 A1* 4/2013 Yun ...................... G09G 3/3648 345/589
2013/0141454 A1* 6/2013 Park ..................... G09G 3/3426 345/589
2013/0176353 A1* 7/2013 Park ..................... G09G 3/2025 345/691
2014/0267464 A1* 9/2014 Takamaru ............ G09G 3/3648 345/102
2014/0292227 A1* 10/2014 Hu ......................... H05B 45/44 315/307
2014/0354176 A1* 12/2014 Chen .................... G09G 3/3406 315/294
2015/0366017 A1* 12/2015 Xu ......................... H05B 45/42 315/192
2016/0117999 A1* 4/2016 Hayashi ............... G09G 3/3648 345/99
2016/0125822 A1* 5/2016 Kang ................... G09G 3/3607 345/88
2016/0349907 A1* 12/2016 Kobayashi ............ G06F 3/0412
2018/0040285 A1* 2/2018 Sakurai ................ G09G 3/3655
2018/0374429 A1* 12/2018 Nakamura ............. G09G 3/344
2020/0090597 A1* 3/2020 Chen .................... G09G 3/3413
2020/0098321 A1* 3/2020 Cooper ............. G02F 1/133602
2020/0152146 A1* 5/2020 Yeh ...................... G09G 3/3688
2020/0211481 A1* 7/2020 Lee ...................... G09G 3/3406
2021/0012724 A1* 1/2021 Wang ................... G09G 3/3413
2021/0097951 A1* 4/2021 Toyotaka ............. G09G 3/3659
2021/0118352 A1* 4/2021 Baek .................... G09G 3/2007
2021/0118394 A1* 4/2021 Zhang .................. G09G 3/3688
2021/0217338 A1* 7/2021 Aksit ................... G09G 3/3406
2021/0271078 A1* 9/2021 Watanabe .......... G02B 27/0101
2022/0230597 A1* 7/2022 Liu ...................... H05B 45/347
2022/0253017 A1* 8/2022 Kim ................... G02B 27/0938
2022/0254303 A1 8/2022 Baumheinrich et al.
2022/0398987 A1* 12/2022 Wyatt .................. H10K 59/351
2022/0415269 A1* 12/2022 Liu ...................... G09G 3/3406
2023/0042768 A1* 2/2023 Choi .................... G09G 3/3406
2023/0055460 A1* 2/2023 Kimura ............. G02F 1/136286
2023/0124285 A1* 4/2023 Noguchi ............... G06F 3/0443 345/173
2023/0237958 A1* 7/2023 Kim ......................... G09G 3/32 345/55

* cited by examiner

METHOD AND APPARATUS FOR LED DRIVER TO REDUCE CROSS TALK OR FLICKER

CROSS-REFERENCE TO RELATED APPLICATIONS

This application claims priority to U.S. Provisional Application No. 63/376,545, filed Sep. 21, 2022, entitled "Method and Apparatus for LED Driver to Reduce Cross Talk or Flicker," the disclosure of which is incorporated by reference in its entirety for all purposes.

SUMMARY

This disclosure relates to systems, methods, and devices to reduce or eliminate image artifacts caused by cross talk or other noise in an electronic display using parking reference voltages in a light emitting diode (LED) driver.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Electronic devices often use one or more electronic displays to present visual information such as text, still images, and/or video by displaying one or more images. For example, such electronic devices may include computers, mobile phones, portable media devices, tablets, televisions, virtual-reality headsets, and vehicle dashboards, among many others. To display an image, an electronic display may control light emission of its display pixels based at least in part on corresponding image data.

For example, an illuminator (e.g., backlight or projector) may generate light for several different pixels, and each pixel may allow a portion of the generated light to be emitted based on a luminance value corresponding to the image data for the pixel. In some embodiments, an electronic display may include illuminators for multiple different color components (e.g., a red illuminator, a green illuminator, a blue illuminator, a white illuminator), and the light generated by each of the different color illuminators may be directed (e.g., via a light guide, one or more mirrors, via one or more color filters) to the pixels of the electronic display. As should be appreciated, such electronic displays may include reflective technology displays (e.g., digital micromirror displays (DMDs), Micro-electro-mechanical system (MEMS) mirror, ferroelectric-liquid-crystal-on-silicon (FLCOS) display, etc.), transmissible displays (e.g., liquid crystal displays (LCDs) having individually controlled color component backlights), or any suitable electronic display having individually controlled color component illuminators. For example, a reflective technology display may have individually controlled color component illuminators that provide light to multiple pixels of the display panel via one or more reflective components (e.g., mirrors, light guides, etc.). Furthermore, the pixels may regulate (e.g., pulse-width modulate) the amount of time (e.g., duty cycle) that the pixel is actively allowing light to be transmitted through and emitted from the pixels according to a luminance value of the image data.

LEDs (white LEDs and red-green-blue (RGB) LEDs) are popular sources of illuminators in the electronic displays. For example, white LEDs may be used with color filters in LCD to provide color illuminators. At the same time, RGB LEDs may be used as color illuminators in the electronic displays to reduce or eliminate the use of color filters. In some embodiments, frequency-sequential-color technique may be used to improve efficiency of LED drivers for the RGB LEDs. The luminance of LEDs is proportional to forward current, and different LEDs may have different forward voltages due to different colors, use time, environmental temperature, etc. For example, the forward voltage of a green or blue LED is generally larger than that of a red LED (e.g., for a same brightness, the green or blue LED may use a larger forward voltage). An LED driver may apply different driving voltages to different LEDs to save power and/or maintain stable driving current.

However, due to different levels of brightness and/or sequential color display, cross talk may happen between color illuminators (e.g., red LED, green LED, blue LED, or white LED), which may create potential flicker and banding on the display panel. For instance, cross talk may occur among color illuminators within an electronic display having the color illuminators coupled to a common electrode (e.g., RGB LEDs using frequency-sequential-color technique), meaning that the forward voltage for the previous color channel may affect the light emission of the next color channel. Further, illuminator setup (e.g., driving voltage or current) for previously displayed image data may affect the display of current image (e.g., due to current variation). The cross talk effect, the effect associated with previously displayed image data, and/or other factors may cause distortions or artifacts perceivable to a viewer (e.g., flicker, banding) on the display panel. These effects may affect the performance of the driver (e.g., LED driver) of the illuminators, such as driving current rise/decline time, driving current overshoot, driving current settling time. These effects may affect the gamma smoothness (e.g., gamma encoding of the gray level of the display pixels) of the electronic display.

The present disclosure generally relates to improving performance of an electronic display by controlling the driving current of an illuminator of the electronic display. More specifically, the performance of the electronic display may be improved by applying an appropriate reference voltage to an illuminator (e.g., a red LED, a green LED, a blue LED, a white LED, etc.) prior to applying the driving voltage to the illuminator. That is, the reference voltage may be applied to the illuminator during a period of time before it starts to generate light. Since different illuminators (e.g., illuminators with different colors, such as red, green, blue, white LED) may have different driving voltages, cross talk may occur between the two illuminators emitting light in sequence (e.g., illuminators may be coupled to a common electrode). The cross talk in driving voltages may cause overshoot in driving current, or longer rise/decline time or settling time in driving current of the illuminator. The value of the reference voltage may be determined to reduce or eliminate the cross talk of driving voltages among different illuminators. Moreover, even for the monochromatic illuminators (e.g., white illuminators), different levels of brightness, and thus different driving voltages, may be used for two succeeding frames. Consequently, the driving voltage for the previously displayed image frame may affect the display of the current image frame. The value of the reference voltage may be determined to reduce or eliminate driving voltages variations from frame to frame. Accordingly, by implementing the reference voltage, the transient performance of the driving current of the illuminator (e.g., the current rise/decline time, current overshoot issue, current settling time) may be improved by reducing or eliminating cross talk in driving voltages among the illuminators or due to previously displayed image frame.

BRIEF DESCRIPTION OF THE DRAWINGS

Various aspects of this disclosure may be better understood upon reading the following detailed description and upon reference to the drawings described below.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

This disclosure relates to electronic displays using reference voltages to control driving current of illuminators to reduce or eliminate cross talk in driving voltages among different illuminators and driving voltage variations from frame to frame. The transient performance of the driving current of the illuminator (e.g., the current rise/decline time, current overshoot issue, current settling time) may be improved by implementing the reference voltages.

Figure 1:
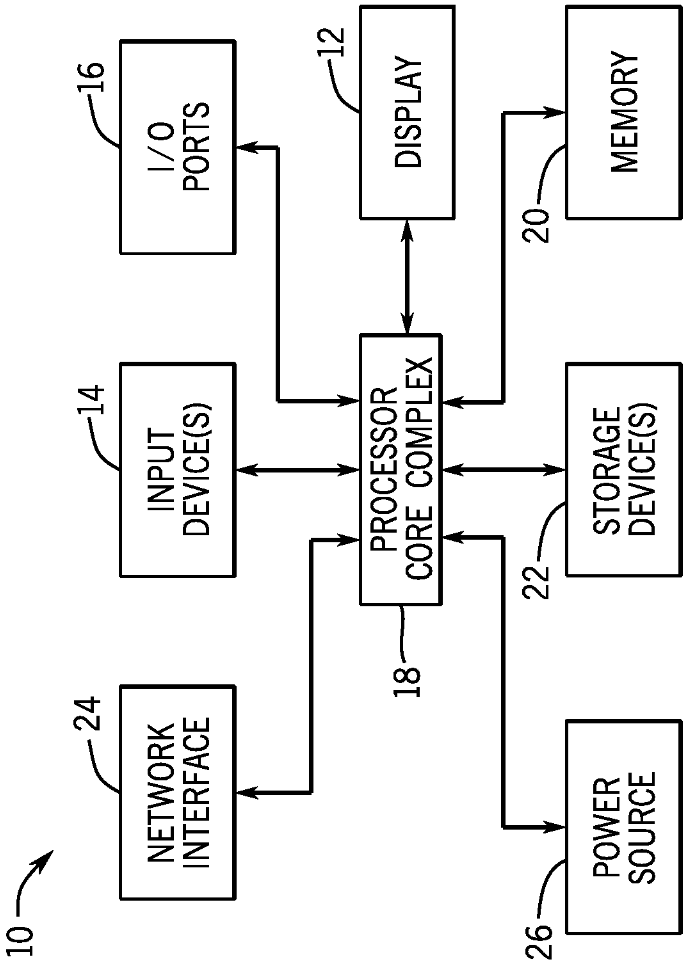
FIG. 1 is a schematic block diagram of an electronic device, in accordance with an embodiment.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processor(s) or processor cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable gate arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch sensing components may receive user inputs by detecting occurrence or position of an object touching the surface of the electronic display 12.

In addition to enabling user inputs, the electronic display 12 may be a display panel with one or more display pixels. For example, the electronic display 12 may include a self-emissive pixel array having an array of one or more of self-emissive pixels. The electronic display 12 may include any suitable circuitry (e.g., display driver circuitry) to drive the self-emissive pixels, including for example row driver and/or column drivers (e.g., display drivers). Each of the self-emissive pixels may include any suitable light emitting element, such as a LED or a micro-LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling pulse emission (e.g., light emission) from its display pixels based on pixel or image data associated with corresponding image pixels (e.g., points) in the image. In some embodiments, pixel or image data may be generated by an image source (e.g., image data, digital code), such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display an image frame of content based on pixel or image data generated by the processor core complex 18, or the electronic display 12 may display frames based on pixel or image data received via the network interface 24, an input device, or an I/O port 16.

Figure 2:
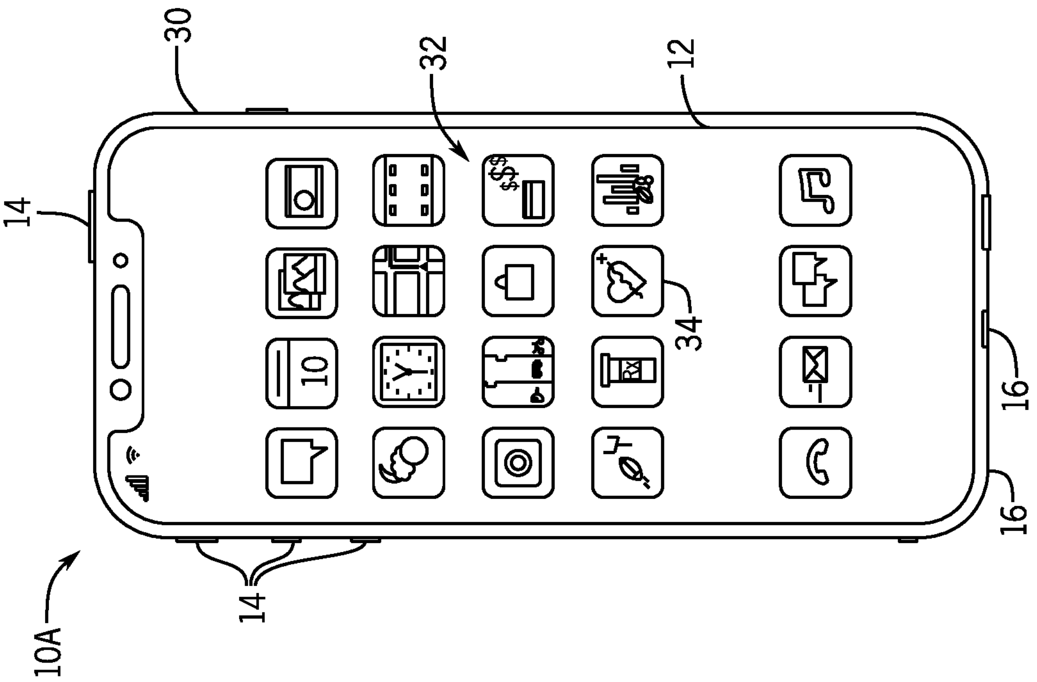
FIG. 2 is a front view of a mobile phone representing an example of the electronic device of FIG. 1, in accordance with an embodiment.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
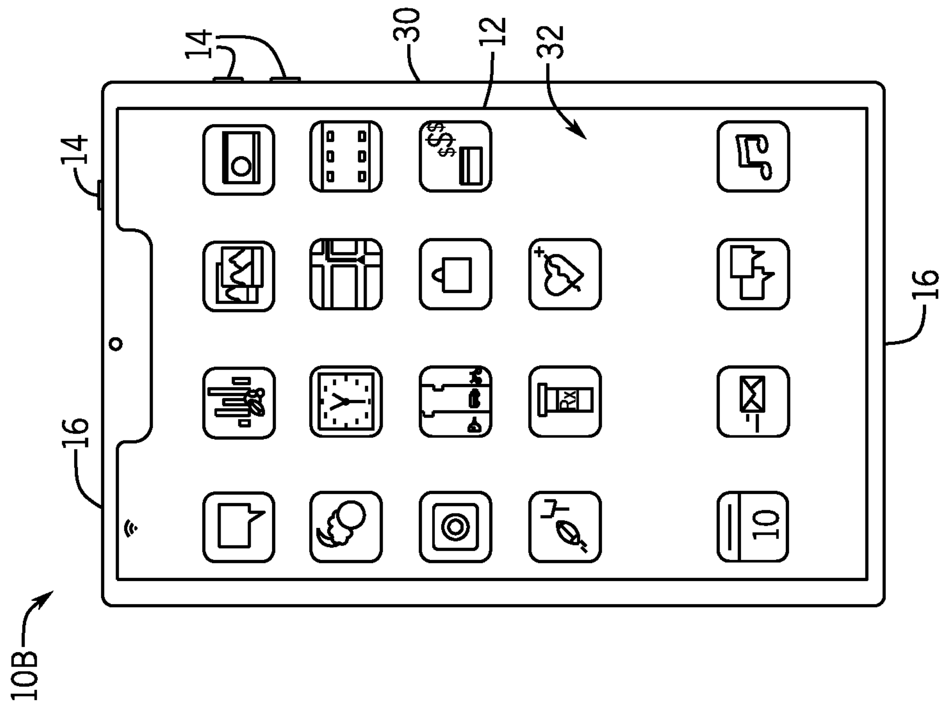
FIG. 3 is a front view of a tablet device representing an example of the electronic device of FIG. 1, in accordance with an embodiment.
Figure 4:
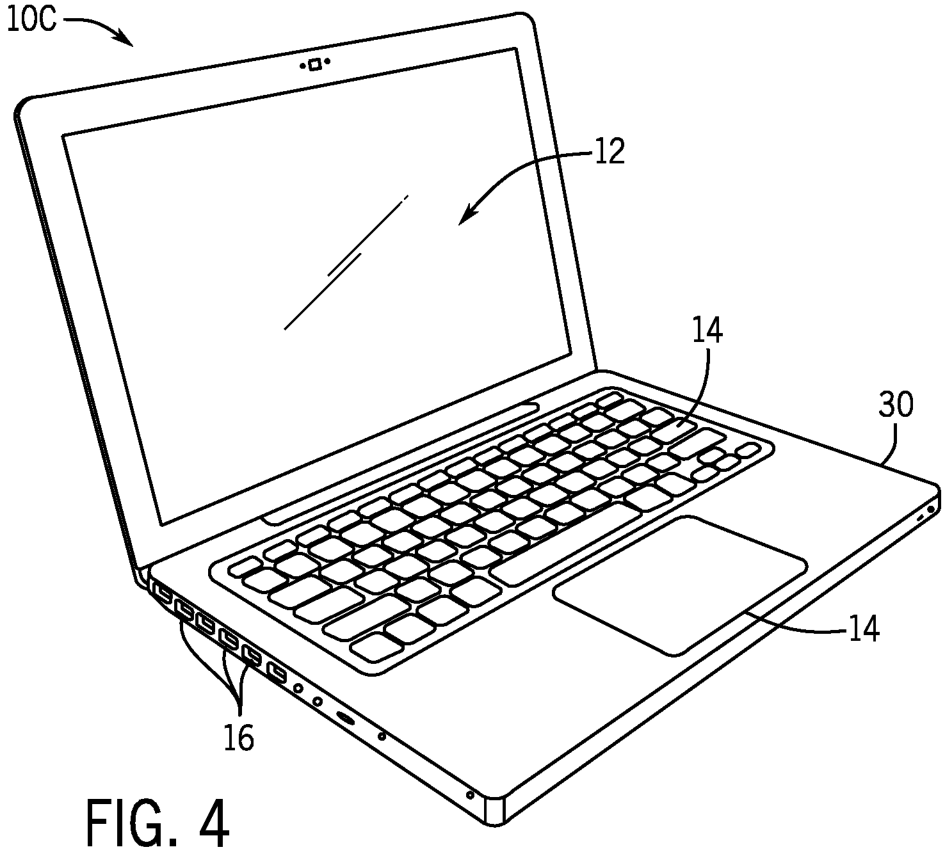
FIG. 4 is a front view of a notebook computer representing an example of the electronic device of FIG. 1, in accordance with an embodiment.
Figure 5:
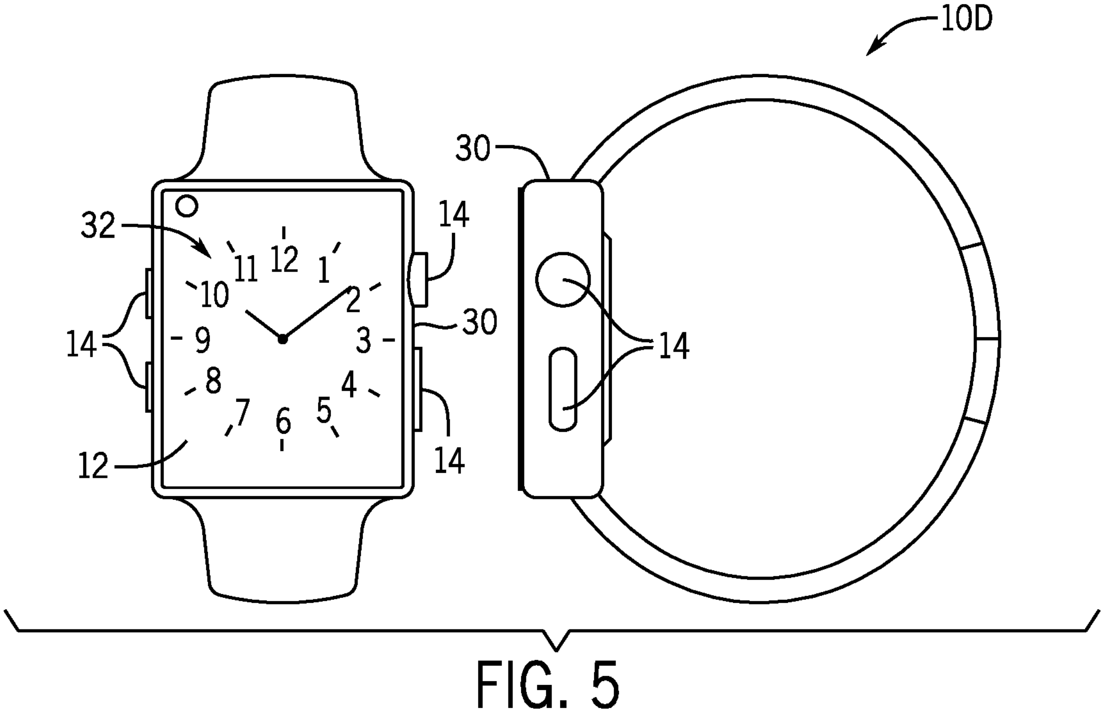
FIG. 5 are front and side views of a watch representing an example of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
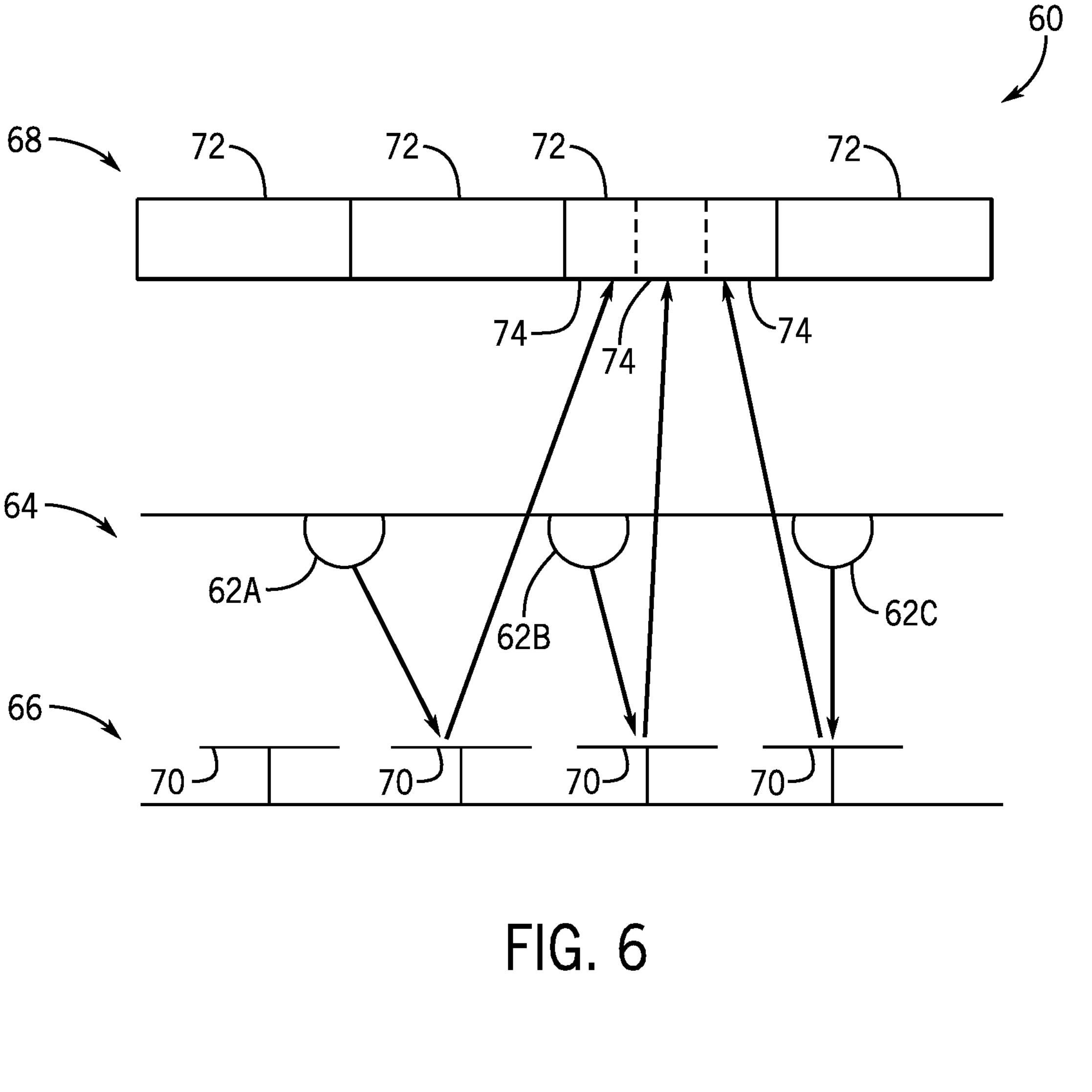
FIG. 6 is a schematic view of an example reflective technology display having different color component illuminators, in accordance with an embodiment.
Figure 7:
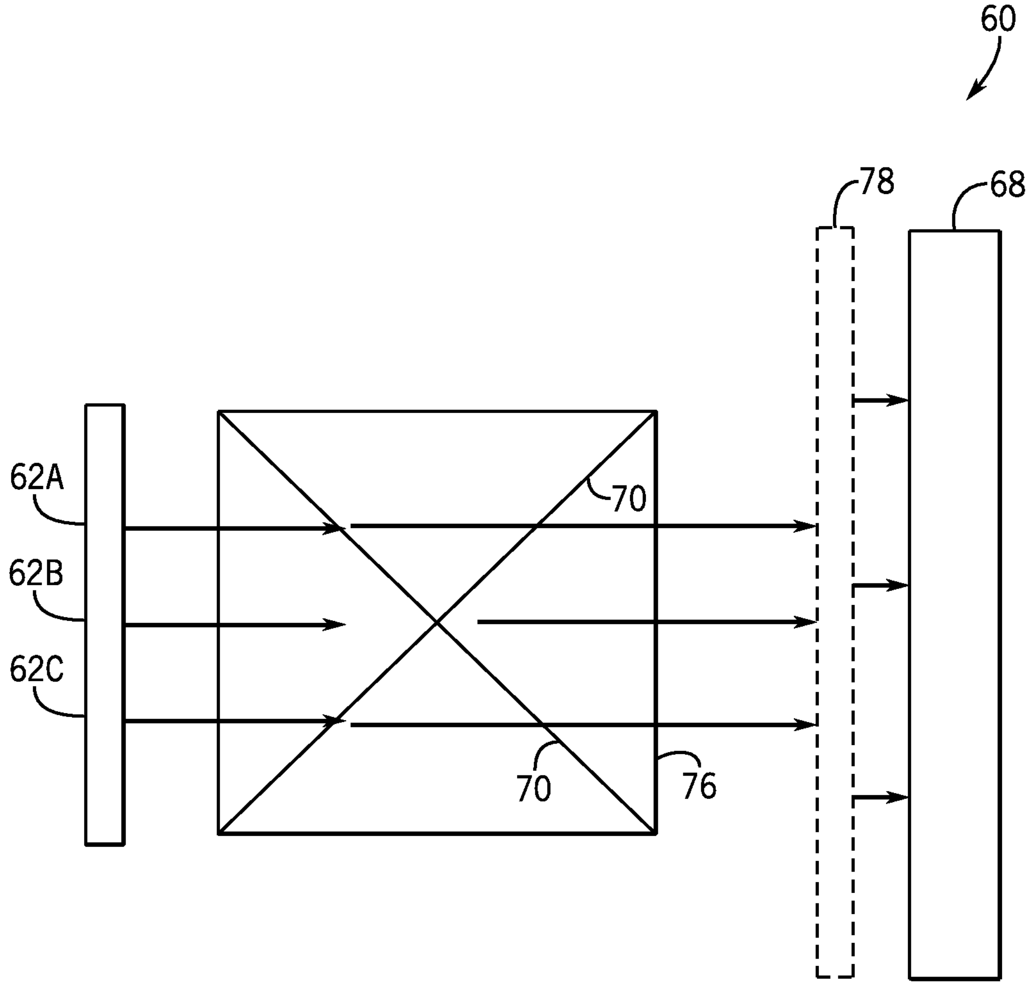
FIG. 7 is a schematic view of an example reflective technology display having different color component illuminators, in accordance with an embodiment.

As described above, the electronic display 12 may include reflective technology displays (e.g., digital micromirror displays (DMDs), ferroelectric-liquid-crystal-on-silicon (FLCOS) displays, etc.) having individually controlled color component illuminators. FIGS. 6 and 7 are schematic views of example reflective technology displays 60 having different color illuminators 62 (e.g., a red illuminator, a green illuminator, a blue illuminator, a white illuminator, etc.). In some embodiments, a reflective technology display 60 may include an illuminator layer 64, a reflective layer 66, and a pixel layer 68, as in FIG. 6. For example, the illuminator layer 64 may include different color illuminators 62 (e.g., a red illuminator 62A, a green illuminator 62B, and a blue illuminator 62C, collectively 62) that generate light in their respective color. The reflective layer 66 may include one or more mirrors 70 that reflect the light generated by the illuminators 62 to one or more pixel positions 72 of the pixel layer 68. At each pixel position 72, the light generated by the illuminators 62 may be visible on the electronic display 12 according to the display image data 56. For example, the mirrors 70 may reflect a portion of the generated light to a pixel position 72 for a certain duty cycle to provide a particular luminance level for an image frame. While separate mirrors 70 are shown for different color channels, the same mirror 70 may be used for different color channels of a particular pixel position 72 at different times. Additionally or alternatively, the pixel positions 72 may include active pixels that limit the amount of light passing therethrough (e.g., based on the display image data 56). Moreover, in some embodiments, the pixel positions 72 may be conceptualized by the individual color components as sub-pixel positions 74.

Additionally or alternatively, the illuminators 62 may project light to a set of multiple mirrors 70 (e.g., a mirror array 76) and be further directed to the pixel positions 72 of the pixel layer 68 via a light guide 78, as in FIG. 7. Moreover, in some embodiments, different color illuminators 62 may generate light on different sides of the mirror array 76, and the mirror array 76 may direct the generated light in a single direction to the viewed portion of the pixel layer 68 with or without the light guide 78. Although shown as a unidirectional light guide 78, as should be appreciated, the light guide 78 may direct the light from the mirror array 76 in any suitable direction to be viewed at the corresponding pixel positions 72 on the electronic display 12.

Indeed, the same mirrors 70 of the mirror array 76 may be used in a time-multiplexed way for different color channels. For example, the red illuminator 62A may be on for a first period, the green illuminator 62B may be on for a second period, and the blue illuminator 62C may be on for a third period. Each mirror 70 of the mirror array 76 may correspond to a pixel position 72 that may display red light during the first period, green light during the second period, and blue light during the third period.

Modulating the mirror array 76 based on a frame of image data causes light emitted by the illuminators 62 to appear as an image corresponding to the image data. For example, independent mirrors 70 of the mirror array 76 may switch between an on-state or an off-state based on the image data. In the on state, the mirrors 70 of the mirror array 76 may direct the light from the illuminators 62 to light up respective pixel positions 72. In the off state, the mirrors 70 of the mirror array 76 may direct the light elsewhere, such as a heatsink, making the associated pixel position 72 appear dark. The mirrors 70 of the mirror array 76 may be toggled between the on-state and the off-state quickly to create small bursts of light. The eyes of the viewer may integrate the light to form an image corresponding to the image data.

Figure 8:
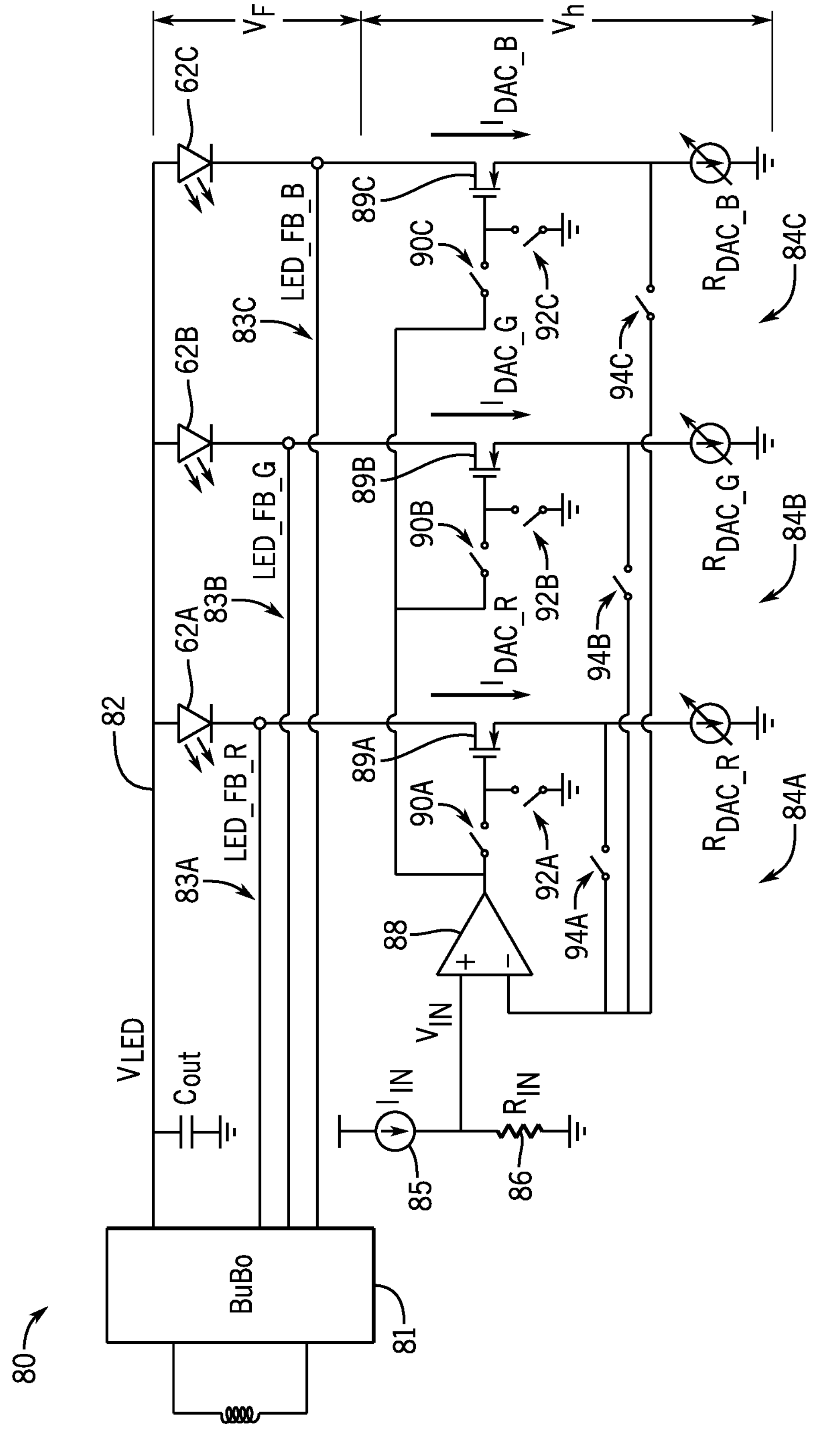
FIG. 8 is a schematic view of an embodiment of an LED driving circuit, in accordance with an embodiment.

FIG. 8 is a schematic view of an embodiment of an LED driving circuit 80 that may drive the illuminators 62. The LED driving circuit 80 includes a power supply 81, which may be a Buck-Boost converter (BuBo) used to provide power for a red illuminator 62A (e.g., a red LED), a green illuminator 62B (e.g., a green LED), and a blue illuminator 62C (e.g., a blue LED) that are connected to a common anode 82. The LED driving circuit 80 further includes a capacitor $C_{out}$, a respective voltage control circuit 83 (e.g., 83A for the red illuminator 62A, 83B for the green illuminator 62B, 83C for the blue illuminator 62C), and a respective current regulation circuit 84 for each illuminator (e.g., 84A for the red illuminator 62A, 84B for the green illuminator 62B, 84C for the blue illuminator 62C). Each voltage control circuit 83 has a respective feedback loop coupled to the corresponding illuminator 62. The respective feedback loops are used to track the respective forward voltages $V_F$ of the corresponding illuminators 62 by using the corresponding feedback loop to feed back the voltages $V_h$ at the cathode end of the corresponding illuminators 62 to the power supply 81. For example, LED_FB_R coupled to the cathode end of the red illuminator 62A is the feedback loop used to track the forward voltage $V_F$ of the red illuminator 62A by using the voltage $V_h$ at the cathode end of the red illuminator 62A. LED_FB_G coupled to the cathode end of the green illuminator 62B is the feedback loop used to track the forward voltage $V_F$ of the green illuminator 62B by using the voltage $V_h$ at the cathode end of the green illuminator 62B. LED_FB_B coupled to the cathode end of the blue illuminator 62C is the feedback loop used to track the forward voltage $V_F$ of the blue illuminator 62C by using the voltage $V_h$ at the cathode end of the blue illuminator 62C. The relationship between the forward voltages $V_F$ and the voltages $V_h$ at the cathode end of the corresponding illuminators 62 is described in more detail below.

A current source 85 ($I_{in}$) is used with a resistor 86 ($R_{in}$) to provide an input voltage $V_{in}$ for an operational amplifier 88 of the current regulation circuits 84. In some embodiment, $V_{in}$ may be a predefined value. A respective emission transistor 89 is used in the corresponding current regulation circuit 84 with corresponding switches 90 and 92 to control the emission status of the corresponding illuminator 62. For example, an emission transistor 89A, a switch 90A, and a switch 92A are used in the corresponding current regulation circuit 84A for the red illuminator 62A to control the emission status of the red illuminator 62A. An emission transistor 89B, a switch 90B, and a switch 92B are used in the corresponding current regulation circuit 84B for the green illuminator 62B. An emission transistor 89C, a switch 90C, and a switch 92C are used in the corresponding current regulation circuit 84C for the blue illuminator 62C. For example, in the current regulation circuit 84A, the emission transistor 89A is turned on when the switch 90A is closed and the switch 92A is open. The switch 92A is used to discharge the gate voltage (or base voltage) at the emission transistor 89A. When the switch 92A is closed, the gate voltage (or base voltage) of the emission transistor 89A is discharged and the emission transistor 89A is turned off. When the switch 90A is open, the emission transistor 89A is disconnected from the current source 85. When the emission transistor 89A is turned on, the red illuminator 62A is connected to a dynamically adjustable resistor $R_{DAC\_R}$ to generate an adjustable current $I_{DAC\_R}$ for the current regulation circuit 84A of the red illuminator 62A. Similarly, when the emission transistor 89B is turned on, the green illuminator 62B is connected to a dynamically adjustable resistor $R_{DAC\_G}$ to generate an adjustable current $I_{DAC\_G}$ for the current regulation circuit 84B of the green illuminator 62B; and, when the emission transistor 89C is turned on, the blue illuminator 62C is connected to a dynamically adjustable resistor $R_{DAC\_B}$ to generate an adjustable current $I_{DAC\_B}$ for the current regulation circuit 84C of the blue illuminator 62C. A switch 94A (a switch 94B for the green illuminator 62B, a switch 94C for the blue illuminator 62C) is used to input a feedback voltage from the emitter end of the emission transistor 89A (emission transistor 89B for the green illuminator 62B, emission transistor 89C for the blue illuminator 62C) to the operational amplifier 88 for the purpose of regulating the adjustable current $I_{DAC\_R}$ ($I_{DAC\_G}$ for the green illuminator 62B, $I_{DAC\_B}$ for the blue illuminator 62C) to reach a predetermined value. It should be noted that, although dynamically adjustable resistors (e.g., $R_{DAC\_R}$, $R_{DAC\_G}$, $R_{DAC\_B}$) are used in the illustrated embodiment in FIG. 8, dynamically adjustable currents may be used in the current regulation circuits 84 in other embodiment for regulating the current of the illuminators.

As illustrated in FIG. 8, the power supply (BuBo) 81 outputs a corresponding driving voltage $V_{LED}$ to the common anode 82 when at least one of the illuminators 62 (e.g., the red illuminator 62A, the green illuminator 62B, the blue illuminator 62C) is controlled to emit light. The driving voltage $V_{LED}$ is a summation of a forward voltage $V_F$ of the corresponding illuminator 62 and the voltage $V_h$ at the cathode end of the corresponding illuminator 62. In some embodiment, $V_h$ may be a predefined value. For example, when the red illuminator 62A is controlled to emit light, the emission transistor 89A is turned on (the switch 90A is closed and the switch 92A is open), and the adjustable current $I_{DAC\_R}$ may be regulated by adjusting the dynamically adjustable resistor $R_{DAC\_R}$ until the voltage at the emitter end of the emission transistor 89A equals to the input voltage $V_{in}$ of the operational amplifier 88, which has a predefine value. The switch 94A is closed to input the feedback voltage from the emitter end of the emission transistor 89A to the operational amplifier 88 to compare with the input voltage $V_{in}$. Accordingly, the adjustable current $I_{DAC\_R}$ is related to the input voltage $V_{in}$ and the dynamically adjustable resistor $R_{DAC\_R}$. Since $V_{in}$ may be a predefined value, the adjustable current $I_{DAC\_R}$ may be regulated to reach a predetermined value. The value of the voltage $V_h$ at the cathode end of the red illuminator 62A is associated with the adjustable current $I_{DAC\_R}$, which is associated with the input voltage $V_{in}$ and the dynamically adjustable resistor $R_{DAC\_R}$ as described above. Accordingly, the value of the voltage $V_h$ at the cathode end of the red illuminator 62A may be controlled to reach a predetermined value by adjusting the adjustable current $I_{DAC\_R}$. Therefore, the value of the forward voltage $V_F$ of the red illuminator 62A may be tracked to achieve the appropriate value for the red illuminator 62A by feeding back the voltage $V_h$ at the cathode end of the red illuminator 62A. The descriptions above are similar for the green illuminator 62B and the blue illuminator 62C. Accordingly, the value of the forward voltage $V_F$ of the green illuminator 62B may be tracked to achieve the appropriate value for the green illuminator 62B by feeding back the voltage $V_h$ at the cathode end of the green illuminator 62B. Similarly, the value of the forward voltage $V_F$ of the blue illuminator 62C may be tracked to achieve the appropriate value for the blue illuminator 62C by feeding back the voltage $V_h$ at the cathode end of the blue illuminator 62C. Since the brightness of each color illuminator 62 (e.g., red illuminator 62A, green illuminator 62B, blue illuminator 62C) is proportional to the respective forward current of the corresponding color illuminator 62, which is associated with the respective adjustable current (e.g., $I_{DAC\_R}$, $I_{DAC\_G}$, $I_{DAC\_B}$), the brightness of each color illuminator 62 may be controlled by regulating the respective adjustable current to a respective predetermined value. In some embodiment, a same value may be used for the adjustable currents of all color illuminators 62 (e.g., $I_{DAC\_R}=I_{DAC\_G}=I_{DAC\_B}$). In some embodiment, a same value of $V_h$ may be used for all color illuminators 62. In some embodiment, the color illuminators 62 may be connect to a common cathode instead of a common anode, and the operation is similar to the description above.

Figure 9:
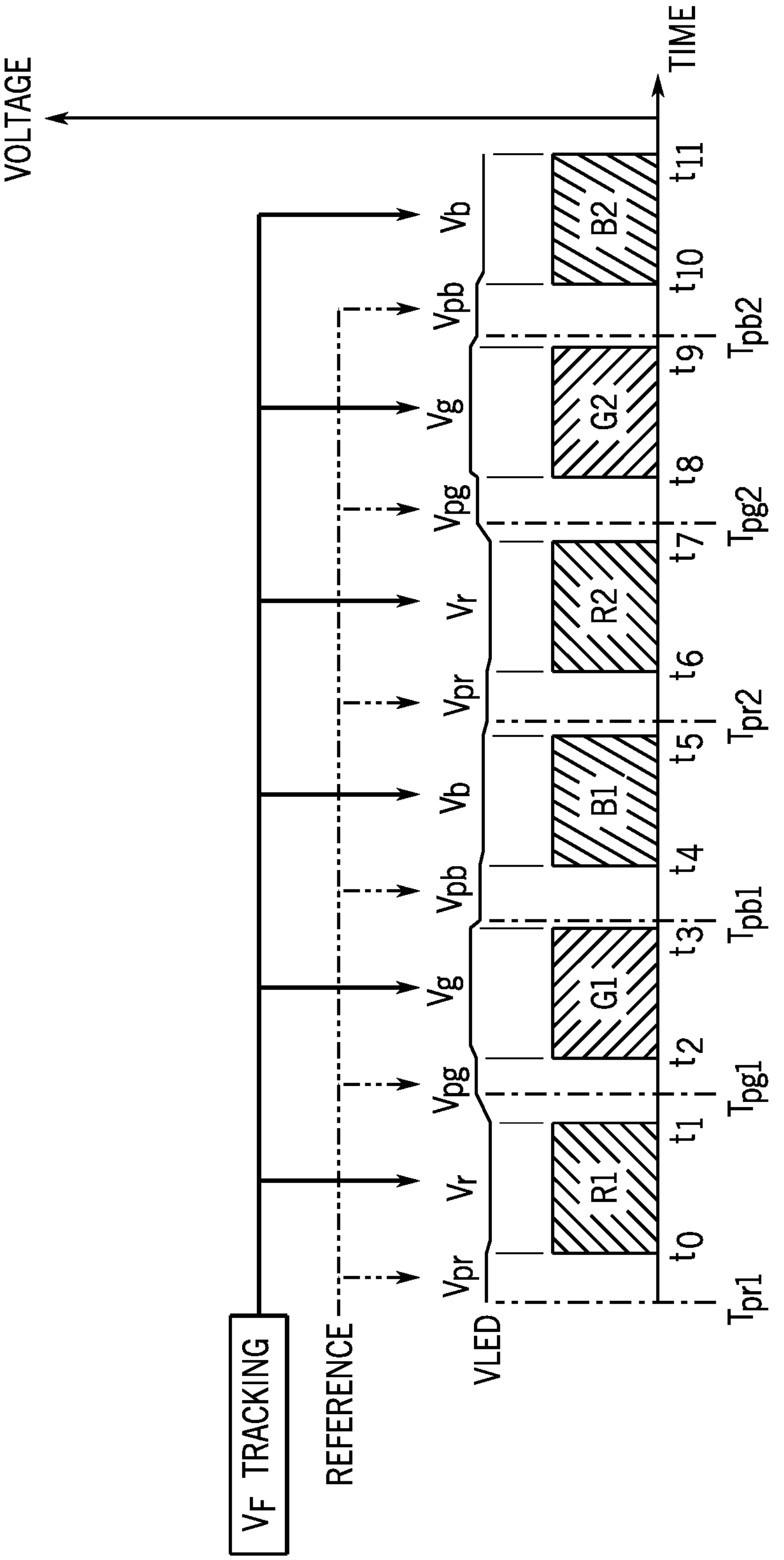
FIG. 9 illustrates example timing diagrams for implementing reference voltages, in accordance with an embodiment.

FIG. 9 illustrates a timing diagram for implementing RGB color sequential display technique, in which the red illuminator 62A, the green illuminator 62B, and the blue illuminator 62C are turned on in sequence with corresponding driving voltage $V_{LED}$. In FIG. 9, the red illuminator 62A has a driving voltage of Vr, the green illuminator 62B has a driving voltage of Vg, and the blue illuminator 62C has a driving voltage of Vb. In the illustrated embodiment, in the first emitting cycle, the red illuminator 62A is controlled to emit light during the period from t0 to t1 (R1), the green illuminator 62B is controlled to emit light during the period from t2 to t3 (G1), the blue illuminator 62C is controlled to emit light during the period from t4 to t5 (B1), and the periods in between (e.g., period from t1 to t2, period from t3 to t4, and period from t5 to t6) are the dark time periods, during which no illuminator 62 emits light (e.g., all illuminators 62 are turned off). In the illustrated embodiment, in the second emitting cycle, similarly, the red illuminator 62A is controlled to emit light during the period from t6 to t7 (R2), the green illuminator 62B is controlled to emit light during the period from t8 to t9 (G2), the blue illuminator 62C is controlled to emit light during the period from t10 to t11 (B2), and the periods in between (e.g., period from t7 to t8, period from t9 to t10) are the dark time periods, during which no illuminator 62 emits light (e.g., all illuminators 62 are turned off). In some embodiments, the light emitting periods (e.g., t0 to t1 (R1), t2 to t3 (G1), t4 to t5 (B1)) may have different values for different color illuminators 62, which may be any value including zero. In some embodiments, the light emitting periods (e.g., t0 to t1 (R1), t2 to t3 (G1), t4 to t5 (B1)) may have the same value for different color illuminators 62, which may be any value including zero. In some embodiment, the value of the light emitting periods may be associated with the corresponding image data. In some embodiment, the value of the light emitting periods may be associated with the type and/or the configuration of the electronic display, and the value of the light emitting periods may be determined at least in part based on the corresponding parameters of the electronic display (e.g., the configuration of the reflective layer 66 and/or the mirror array 76). In some embodiments, the dark time periods (e.g., period from t1 to t2, period from t3 to t4, and period from t5 to t6) may have different values, which may be any value including zero. In some embodiments, the dark time periods (e.g., period from t1 to t2, period from t3 to t4, and period from t5 to t6) may have the same value, which may be any value including zero. In some embodiment, the value of the dark time periods may be associated with the corresponding image data, and the value of the dark time periods may have a minimum nonzero value determined based on the corresponding image data. In some embodiment, the value of the dark time periods may be associated with the type and/or the configuration of the electronic display, and the value of the dark time periods may be within a particular range determined based on the corresponding parameters of the electronic display (e.g., the configuration of the reflective layer 66 and/or the mirror array 76).

As illustrated in FIG. 8, the driving voltage $V_{LED}$ is related to the corresponding forward voltage $V_F$ of the corresponding color illuminator 62. As illustrated in FIG. 9, the value of the forward voltage $V_F$ of a color illuminator 62 may be tracked to achieve the appropriate value for the corresponding color illuminator 62. However, because different illuminators may have different driving voltages (e.g., for the purpose of saving power and/or maintain stable driving current), there may be cross talk between different color illuminators. For example, in the illustrated embodiment in FIG. 8, a capacitor $C_{out}$ is used to keep a certain voltage at the common anode 82 when the illuminators are turned off (e.g., for the purpose of reducing the rise time of the driving current and/or power saving). The voltage at the common anode 82 is applied to all the color illuminators 62. Accordingly, the driving voltage of one color illuminator 62 may have an effect on the other color illuminators 62 even after it is turned off. For example, when the red illuminator 62A is on (e.g., the green illuminator 62B and the blue illuminator 62C are off), the driving voltage $V_{LED}$ for the red illuminator 62A has a value of Vr, and this Vr is kept at the common anode 82 by the capacitor $C_{out}$ even when the red illuminator 62A is turned off. Accordingly, V1 is applied to the anodes (e.g., the common anode 82) of the green illuminator 62B and the blue illuminator 62C even before they are turned on. Assume the green illuminator 62B is scheduled to be turned on right after the red illuminator 62A, as illustrated in FIG. 9. The driving voltage $V_{LED}$ for the green illuminator 62B is Vg. Since Vr and Vg may be different, it may take a substantial time for the driving current of the green illuminator 62B to settle down to the target value, which is determined by the driving voltage Vg. For example, when Vr is smaller than Vg, it may increase the rise time of the driving current to reach its target value. In the case that Vr is larger than Vg, driving current overshoot may occur. Accordingly, it is beneficial to prepare the voltage at the common anode 82 before turning on each color illuminator 62. It should be noted that, even for those LED driving circuits 80 without the capacitor $C_{out}$, it is beneficial to prepare the voltage at the common anode 82 before turning on each color illuminator 62. For example, after the red illuminator 62A is turned off, the voltage at the common anode 82 may drop to a value different from the driving voltage for the green illuminator 62B and/or the blue illuminator 62C before the green illuminator 62B and/or the blue illuminator 62C is turned on. In some embodiment, the color illuminators 62 may be connect to a common cathode instead of a common anode, and the operation is similar to the description above. It should be noted that, although the same driving voltages (e.g., Vr, Vg, Vb) are used for the same color illuminators (e.g., 62A, 62B, 62C) during different time periods (e.g., R1 and R2, G1 and G2, B1 and B2) in the illustrated embodiment in FIG. 9, the same color illuminator may have different driving voltages at different time. For example, the driving voltage for the red illuminator 62 A in R1 may be different from the driving voltage in R2. Accordingly, the driving current for the same color illuminator may have different values at different time.

Further, illuminator setup for previously displayed image data may affect the display of current image (e.g., due to current variation). Consequently, it may take a substantial time for the LED driving circuit 80 to settle down to the target driving voltage $V_{LED}$. Moreover, the different driving voltages may cause driving current overshoot issue. The cross talk effect, the effect associated with previously displayed image data, and/or other related factors may cause distortions or artifacts perceivable to a viewer (e.g., flicker, banding) on the display panel. These effects may also affect the performance of the driver (e.g., LED driver) of the illuminators, such as driving current rise/decline time, driving current overshoot, driving current settling time. These effects may affect the gamma smoothness (e.g., gamma encoding of the gray level of the display pixels) of the electronic display. Accordingly, it is beneficial to prepare the voltage at the common anode 82 before turning on each color illuminator 62.

As illustrated in FIG. 9, a corresponding reference voltage for each color illuminator 62 is applied to the common anode 82 during the dark time period before the corresponding color illuminator 62 is controlled to emit light. For example, a reference voltage Vpr is applied to the common anode 82 at a time Tpr1 in the dark time period before time t0, e.g., before the emitting period of the red illuminator 62A in the first emitting cycle. A reference voltage Vpg is applied to the common anode 82 at a time Tpg1 in the dark time period from t1 to t2, e.g., before the emitting period of the green illuminator 62B in the first emitting cycle. A reference voltage Vpb is applied to the common anode 82 at a time Tpb1 in the dark time period from t3 to t4, e.g., before the emitting period of the blue illuminator 62C in the first emitting cycle. Similarly, for the second emitting cycle, the reference voltages are applied to the common anode 82 in the same manner. That is, before the emitting period of each color illuminator 62, a corresponding reference voltage is applied to the common anode 82. The reference voltage may be applied to the common anode 82 at any time in the corresponding dark time period. The reference voltage may be applied to the common anode 82 for any time period that is within the dark time period, e.g., the reference voltage may be turned off (e.g., disconnect from the common anode 82, or turn off the corresponding power supply) at any time before the corresponding next color illuminator starts to emit light. For example, in the illustrated embodiment in FIG. 9, the reference voltage Vpg is applied to the common anode 82 at time Tpg1 and is continuously applied to the common anode 82 until the time t2 when the driving voltage Vg for the green illuminator 62B is applied to the common anode 82. However, it should be noted that, in some embodiment, the reference voltage (e.g., Vpg) may be turned off any time (e.g., a dynamic threshold time, a predetermined time) before the time (e.g., t2) that the driving voltage (e.g., Vg) for the corresponding next color illuminator (e.g., the green illuminator 62B) is applied to the common anode 82. In some embodiment, the turning on/off time of the reference voltages and/or the duration that the reference voltages are applied to the common anode 82 may be associated with the properties of the LED driving circuit 80 (e.g., the capacitance of $C_{out}$). In some embodiment, the color illuminators 62 may be connect to a common cathode instead of a common anode, and the operation is similar to the description above.

The value of the reference voltage may be any appropriate value that may be determined to reduce or eliminate the cross talk of driving voltages among different illuminators. For example, in some embodiment, the value of the reference voltage Vpr may be any value in the range between the Vb and Vr, the value of the reference voltage Vpg may be any value in the range between the Vr and Vg, and the value of the reference voltage Vpb may be any value in the range between the Vg and Vb. In some embodiment, the value of the reference voltages may be a certain function of the second voltage. In some embodiment, the reference voltage may be set to a value close to the succeeding driving voltage (e.g., Vpr is set to a value close to the voltage Vr), e.g., having a difference less than a certain value (e.g., less than 50 mV) or a certain percentage value (e.g., less than 10% of the succeeding driving voltage). In some embodiment, the value of the reference voltages may be associated with the properties of the LED driving circuit 80 (e.g., the capacitance of $C_{out}$), the turning on/off time of the reference voltages, and/or the duration that the reference voltages are applied to the common anode 82. It should be noted that the reference voltage may be larger than the succeeding driving voltage or smaller than the succeeding driving voltage. It should be noted that the reference voltage may be larger than the preceding driving voltage or smaller than the preceding driving voltage. The reference voltage may be different for different succeeding color illuminators 62, and the reference voltage may be the same for different succeeding color illuminators 62. When the voltage at the common anode 82 is stepping down due to the applying of the reference voltage or the applying of the driving voltage $V_{LED}$, a negative inductor current may be used to recycle energy. The reference voltages and corresponding applying time/periods may be determined by a processing circuitry, such as the processor core complex 18, a graphics processing unit (GPU), or an image sensor. The reference voltages may be stored in a look-up table or may be calculated in real time. In some embodiment, the color illuminators 62 may be connect to a common cathode instead of a common anode, and the operation is similar to the description above.

Moreover, for monochromatic illuminators (e.g., white illuminators, single color illuminators, illuminators with time-varying color filters), different levels of brightness, and thus different driving voltages, may be used for two succeeding frames. Consequently, the driving voltage for the previously displayed image frame may affect the display of the current image frame. The value of the reference voltage may be determined similarly as described above for the color illuminators to reduce or eliminate driving voltages variations from frame to frame.

Figure 10:
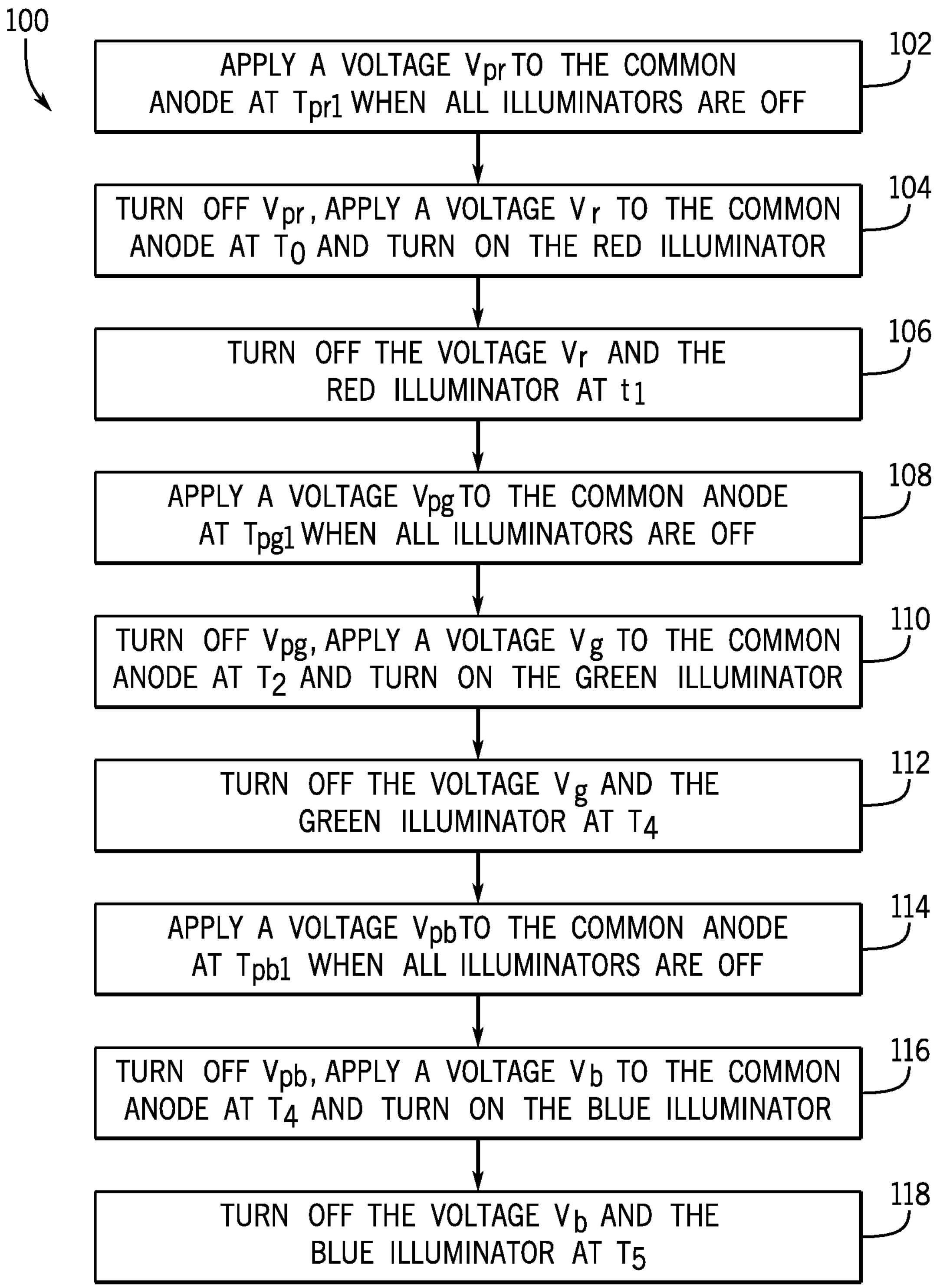
FIG. 10 illustrates a flow diagram of a method for implementing reference voltages in an emitting cycle of color illuminators, in accordance with an embodiment.

FIG. 10 is a flow diagram of a method 100 for implementing reference voltages in an emitting cycle of color illuminators 62. At block 102, all color illuminators 62 are in off situation at time Tpr1, and a reference voltage Vpr is applied to the common anode 82. At block 104, A driving voltage Vr is applied to the common anode 82 at time t0, and the red illuminator 62A is turned on to emit light by controlling the emission transistor 89A and the switches 90A, 92A, and 94A, as described in FIG. 8. At time t0, the reference voltage Vpr is turned off. It should be noted that, in some embodiment, the reference voltage Vpr may be turned off any time before time t0. At block 106, the driving voltage Vr is turned off at time t1, and the red illuminator 62A is turned off by controlling the emission transistor 89A and the switches 90A, 92A, and 94A, as described in FIG. 8. At block 108, all color illuminators 62 are in off situation at time Tpg1, and a reference voltage Vpg is applied to the common anode 82. At block 110, A driving voltage Vg is applied to the common anode 82 at time t2, and the green illuminator 62B is turned on to emit light by controlling the emission transistor 89B and the switches 90B, 92B, and 94B, as described in FIG. 8. At time t2, the reference voltage Vpg is turned off. It should be noted that, in some embodiment, the reference voltage Vpg may be turned off any time before time t2. At block 112, the driving voltage Vg is turned off at time t3, and the green illuminator 62B is turned off by controlling the emission transistor 89B and the switches 90B, 92B, and 94B, as described in FIG. 8. At block 114, all color illuminators 62 are in off situation at time Tpb1, and a reference voltage Vpb is applied to the common anode 82. At block 116, A driving voltage Vb is applied to the common anode 82 at time t4, and the blue illuminator 62C is turned on to emit light by controlling the emission transistor 89C and the switches 90C, 92C, and 94C, as described in FIG. 8. At time t4, the reference voltage Vpb is turned off. It should be noted that, in some embodiment, the reference voltage Vpb may be turned off any time before time t4. At block 118, the driving voltage Vb is turned off at time t5, and the blue illuminator 62C is turned off by controlling the emission transistor 89C and the switches 90C, 92C, and 94C, as described in FIG. 8. In some embodiment, the color illuminators 62 are connect to a common cathode instead of a common anode, and the description above are similar.

The specific embodiments described above have been shown by way of example, and it should be understood that these embodiments may be susceptible to various modifications and alternative forms. It should be noted that, although LEDs and LED drivers are used in the embodiments described above, other illuminators and their drivers may use the techniques presented above. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A device comprising:

a first illuminator configured to generate first light during a first time period;

a second illuminator configured to generate second light during a second time period, wherein the first illuminator and the second illuminator are coupled to a common electrode and a driver configured to:

provide a first driving voltage to the common electrode during the first time period;

provide a second driving voltage to the common electrode during the second time period, wherein the second time period is separated from the first time period by a dark time period; and provide a reference voltage, determined based on at least the first driving voltage or the second driving voltage, to the common electrode during a third time period, wherein the third time period is within the dark time period.

2. The device of claim 1, wherein:

the first illuminator is a red illuminator, a green illuminator, or a blue illuminator; and the second illuminator is of a different color than the first illuminator.

3. The device of claim 1, wherein the device comprises a digital micromirror display that is illuminated by the first illuminator and the second illuminator.

4. The device of claim 1, wherein the reference voltage has a value between the first driving voltage and the second driving voltage.

5. The device of claim 1, wherein the reference voltage has a value within a particular range of the second driving voltage.

6. The device of claim 1, wherein the reference voltage is turned off at a particular time during the dark time period, wherein the particular time is a particular amount of time before the second time period starts.

7. The device of claim 1, wherein the reference voltage is turned off at a particular time during the dark time period, wherein the particular time is a particular amount of time after the first time period ends.

8. The device of claim 1, wherein the dark time period is longer than a minimum value associated with at least one of image data to be displayed by the device, or parameters of the device.

9. A device comprising:

an electronic display illuminated by a first illuminator and a second illuminator, wherein the first illuminator and the second illuminator are coupled to a common electrode; and processing circuitry configured to:

program a first driving voltage applied to the common electrode during a first time period to enable the first illuminator to emit light;

program a second driving voltage applied to the common electrode during a second time period to enable the second illuminator to emit light, wherein the second driving voltage is separated from the first time period by a dark time period; and program a reference voltage, determined based on at least the first driving voltage or the second driving voltage, applied to the common electrode during a third time period, wherein the third time period is within the dark time period.

10. The device of claim 9, wherein:

the first illuminator is a red illuminator, a green illuminator, or a blue illuminator; and the second illuminator is of a different color than the first illuminator.

11. The device of claim 9, wherein the electronic display comprises a digital micromirror display.

12. The device of claim 9, wherein the reference voltage has a value between the first driving voltage and the second driving voltage.

13. The device of claim 9, wherein the reference voltage has a value higher than the second driving voltage.

14. The device of claim 9, wherein the reference voltage is turned off at a particular time during the dark time period, wherein the particular time has a specific value before the second time period starts, wherein the specific value is associated with properties of the electronic display.

15. The device of claim 9, wherein the reference voltage is turned off at a particular time during the dark time period, wherein the particular time has a specific value after the first time period ends, wherein the specific value is associated with properties of the electronic display.

16. The device of claim 9, wherein the dark time period is longer than a minimum value.

17. A device comprising:

an illuminator configured to:

generate first light during a first time period; and generate second light during a second time period; and a driver configured to:

provide a first driving voltage to the illuminator during the first time period;

provide a second driving voltage to the illuminator during the second time period, wherein the second time period is separated from the first time period by a dark time period; and provide a reference voltage, determined based on at least the first driving voltage or the second driving voltage, to the illuminator during a third time period, wherein the third time period is within the dark time period.

18. The device of claim 17, wherein the illuminator is a white illuminator.

19. The device of claim 17, wherein the dark time period is longer than a minimum value associated with at least one of image data to be displayed by the device, or parameters of the device.

20. A method comprising:

applying, via a driver, a first reference voltage to a common electrode of a first illuminator and a second illuminator for a first time period, during which the first illuminator and the second illuminator are turned off, wherein the first reference voltage is determined based on a first driving voltage of the first illuminator;

applying, via the driver, the first driving voltage to the common electrode to enable the first illuminator to emit light for a first emission time period after applying the first reference voltage for the first time period;

applying, via the driver, a second reference voltage to the common electrode for a second time period after the first emission time period, wherein the second reference voltage is determined based on a second driving voltage of the second illuminator; and applying, via the driver, the second driving voltage to the common electrode to enable the second illuminator to emit light for a second emission time period after applying the second reference voltage for the second time period.

* * * * *